Sept. 6, 1955  V. ISACCO  2,717,043
CONTRACTABLE JET-DRIVEN HELICOPTER ROTOR
Filed May 16, 1952  6 Sheets-Sheet 1

INVENTOR
Vittorio Isacco

BY
ATTORNEY

Sept. 6, 1955 V. ISACCO 2,717,043
CONTRACTABLE JET-DRIVEN HELICOPTER ROTOR
Filed May 16, 1952 6 Sheets-Sheet 2

INVENTOR
Vittorio Isacco
BY
ATTORNEY

Sept. 6, 1955 V. ISACCO 2,717,043
CONTRACTABLE JET-DRIVEN HELICOPTER ROTOR
Filed May 16, 1952 6 Sheets-Sheet 3

INVENTOR
Vittorio Isacco.
BY
ATTORNEY

Sept. 6, 1955 V. ISACCO 2,717,043
CONTRACTABLE JET-DRIVEN HELICOPTER ROTOR
Filed May 16, 1952 6 Sheets-Sheet 5

INVENTOR
Vittorio Isacco.
BY
ATTORNEY

United States Patent Office 2,717,043
Patented Sept. 6, 1955

2,717,043
CONTRACTABLE JET-DRIVEN HELICOPTER ROTOR

Vittorio Isacco, Paris, France

Application May 16, 1952, Serial No. 288,136

15 Claims. (Cl. 170—135.4)

My invention relates to helicopters, and more particularly to helicopters having rotors driven by jet engines mounted at the tips of the rotor blades, particularly telescopic blades. This application is a continuation-in-part of application, Serial No. 688,270, filed August 3, 1946, now Patent No. 2,640,549.

My invention also concerns an improvement to the type of rotating wing parachute as described in Patent No. 2,457,376 of December 28, 1948, and results in a helicopter, or helicopter parachute, which are readily launchable from planes while in flight as a parachute, and then, while in steady descent, be utilized as a helicopter by operation of the engines.

The employment of the rigid blades in all actual helicopters precludes a compact construction and makes them unfit in practice as portable helicopters. Finally, they can not be launched as a parachute from planes in flight.

It is an object of the present invention to provide a helicopter of compact structure that will have considerable application in both civilian and military fields.

Another object of the invention is to provide highly efficient means associated with telescopic rotor blades for feeding fuel to the engines on the tips of such blades and for the control of the throttle, and ignition if necessary, of these engines both before and after development of the blades.

The invention, both as to its organization and its method of operation, together with additional objects and advantages, will best be understood from the following description of specific embodiments when read in connection with the accompanying drawings, in which.

Figure 1:
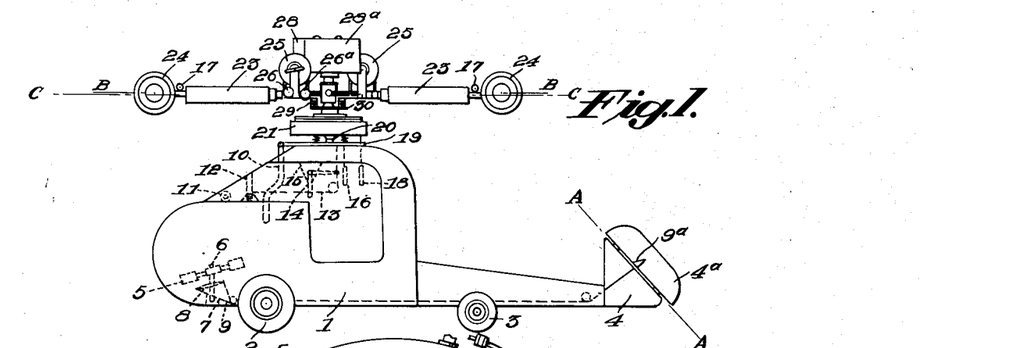
Figure 1 is a side view in elevation of a small helicopter or launchable helicopter in accordance with the present invention.

The helicopter shown in Figure 1 comprises a fuselage 1, which may be provided with the standard four-wheel landing gear including front wheels 2 and rear wheels 3. A rudder 4 is mounted on the tail of the fuselage and includes a flap 4a which is pivoted on an inclined axis A—A. The flap 4a, in this example, is controlled by foot pedals 5 which are fixed on a shaft 6 which is rotatably mounted in a bearing 7. A double lever 8 is fixed on the shaft 6; cables 9 are connected between the respective ends of said lever 8; and a pair of levers 9a are on opposite sides of the flap.

Figures 6, 7, 8:
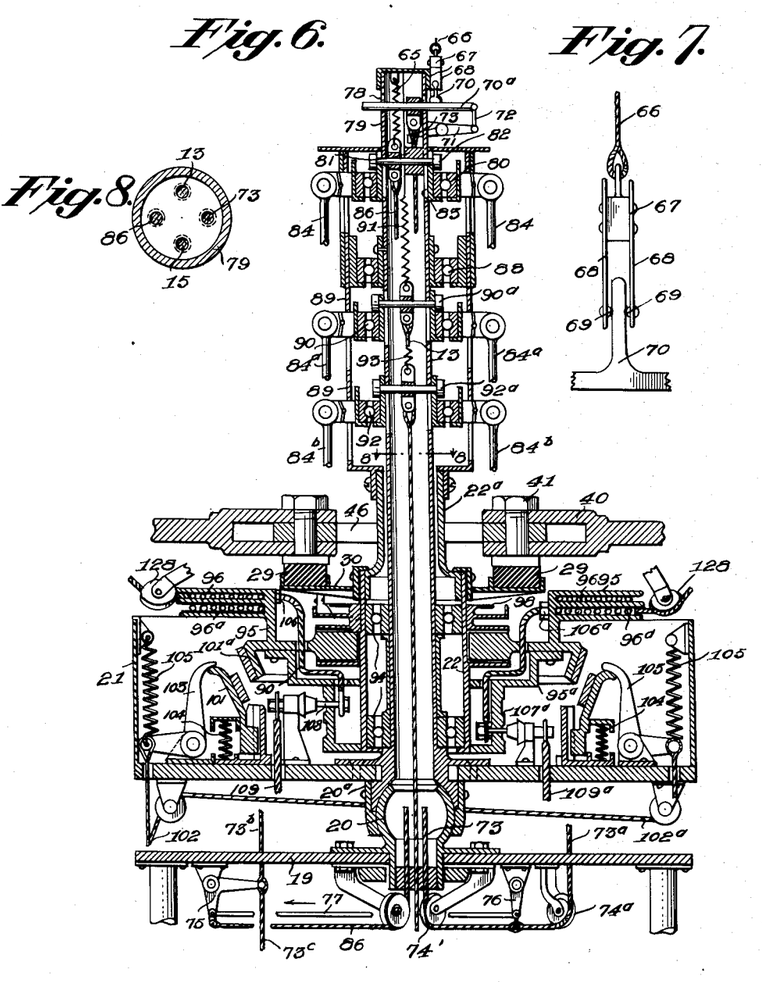
Figure 6 is an enlarged complete sectional view taken on the same plane as Figures 3 and 5.
Figure 7 is an enlarged fragmentary view in elevation of a release device attached to the static line of a plane.
Figure 8 is a fragmentary sectional view corresponding to line 8—8 of Figure 6 and showing the position of the control wires.

Within the fuselage, as shown in broken lines, are the main control lever 10 for inclining the rotor shaft in the desired direction, the switch 11 for the ignition control of the engines, the throttle lever 12 connected with the control cable 13 for regulating the engines 24, the general pitch angle control lever 14 connected with the control cable 15, the handle 16 for initiating operation of the powder rockets 17, and the handle 18 for actuating the device for retracting the blades after landing. On top of the fuselage 1 is a fixed plate 19, at the center of which is fixed a universal joint 20. A support or case 21 is carried by the universal joint 20, as best seen in Figure 6, and may be adjustably inclined thereon by means of the main control lever 10.

The case 21 has a centrally disposed hollow shaft 79 rigidly connected therewith and extending thereabove. The shaft 79 is connected to the universal joint 20 below the case 21 by a nut 20a. A hub 22 is journalled by bearings 94 (Figure 6) on the shaft 79 within the case 21, and this hub carries an upper hub 22a which extends above the case 21, and on which are hinged the root elements 23 of the telescopic blades. The engines 24, ramjet engines being illustrated as an example, are respectively mounted on the tip elements of the blades, the center line BB of said engines 24, lying slightly above the longitudinal axis CC of the blades, as shown in Figure 1. This disposition of the jet engines, as described in my Patent No. 2,474,359 prevents upward inclination of the blades under abnormal air pressure, since the thrust of the engines tends to lower the leading edges of the blades.

A reel 25 and guide pulleys 26 and 26a are mounted at the root end of each blade for accommodating the fuel pipe and the controls which extend through the blades. Fuel reservoirs 28 and 28a, one for supplying each engine 24, are fixed above the hub 22a and rotate with the blades. The blades bear at rest against elastic stops 29 carried by a plate 30, which is fixed on the hub 22a, as best shown in Figure 6.

Figure 2:
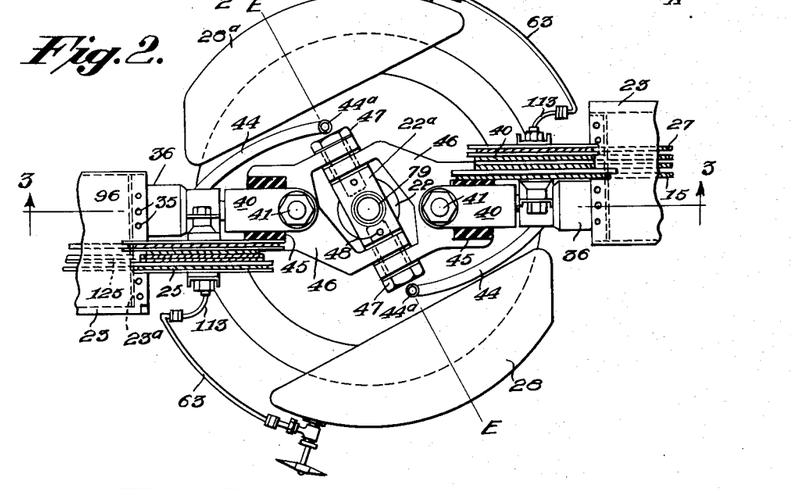
Figure 2 is a top view of the rotor, pulleys and blade mountings for a helicopter of the type shown in Figure 1.
Figure 3:
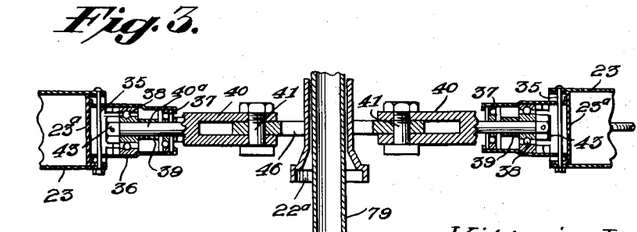
Figure 3 is a fragmentary sectional view corresponding to line 3—3 of Figure 2.

Referring now to Figures 2 and 3, the root elements 23 of the telescopic blades are closed by end plates 23a which are each attached, by means of bolts 35, to a cylindrical housing 36 extending longitudinally of the blade. Each housing 36 is mounted, by means of a thrust bearing 37 and a radial bearing 38, spaced by a sleeve 39, on a stub shaft 40a and retained by a nut 43. The shaft 40a is rigidly carried by a fork 40, which is mounted by a vertical pivot 41 on a main fork 46. The forks 46 are pivotally mounted on the upper hub 22a by a pair of coaxial bolts 47 which are threaded into the hub 22a radially of the main shaft 79 on an axis E—E and retained by set screws 48.

The longitudinal axes of the forks 40 are on a common axis which is diametrical of the main shaft 79 but is at an angle of inclination to the axis E—E of the bolts 47. An arm 44 is fixed on each housing 36 and extends to and has its free end 44a disposed on the axis E—E. The lever ends 44a are movable upwards or downwards by the pitch angle control, as will be described hereinafter, and thus will increase or decrease the pitch angle of the blades. The hinging of the blades around their vertical pivots 41 is limited to a very small amplitude of about 3° by means of resilient stops 45 between the secondary forks 40 and the main forks 46. The aforementioned reels 25 and pulleys 26 and 26a are mounted on the housings 36, and the reels 25 are respectively connected at their centers with flexible fuel pipes 63 which are in communication with the fuel tanks 28 and 28a respectively.

Figure 4:
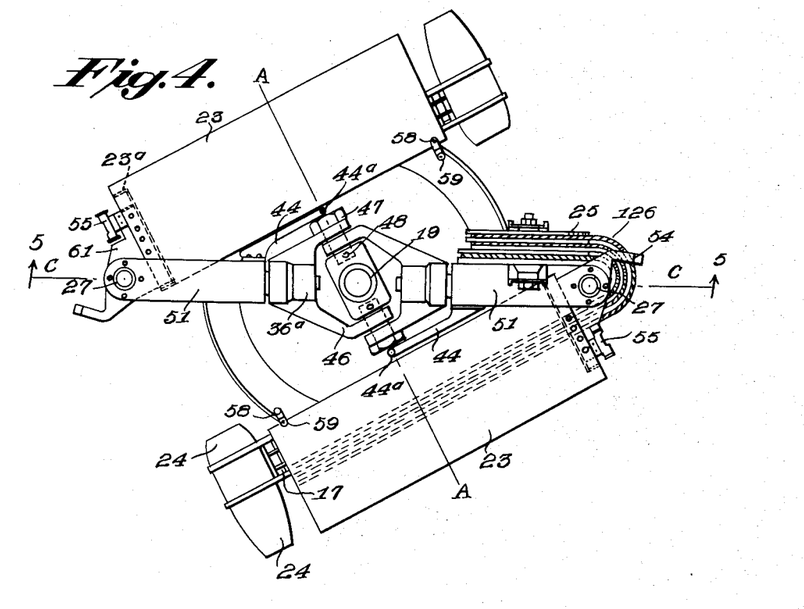
Figure 4 is a top view of the rotor, pulleys and blade mountings for a helicopter.
Figure 5:
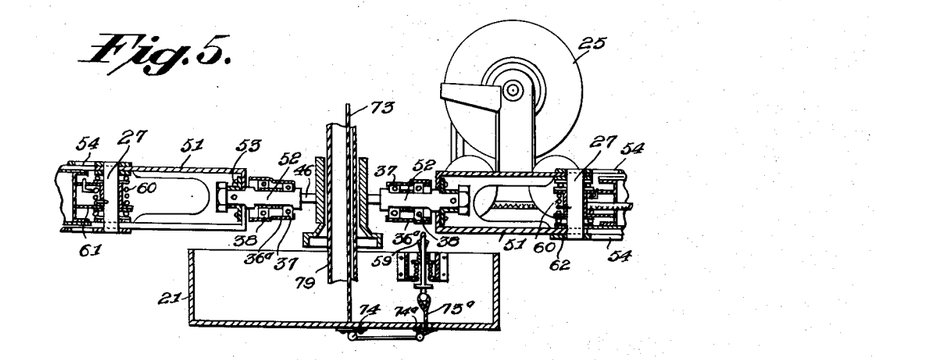
Figure 5 is a vertical sectional view corresponding to line 5—5 of Figure 4 but with the blades hinged in their flight position.

To accommodate the hinging of the blades, referring to Figures 4 and 5, the journal housings 36 of Figures 2 and 3 are replaced by bearing members 61 and hollow forks 51, as described in my Patent No. 2,545,736. The bearing members 61 are fixed to the end plates 23a of the root blade elements 23 and are journalled on vertically disposed pivots 27 which are carried by the forks 51. Springs 60 are mounted around the pivots 27 and have their ends respectively anchored to the pivots and the bearing members 61 and bias the blades toward operative position. Thrust bearings 62 are mounted on the pivots 27 between the bearing members 61 and the forks 51 for insuring easy hinging movement of the blades.

The fork 51 are mounted to rotate around the longitudinal axis CC of variable pitch angle, the control levers 44 being fixed to said forks. The mounting of the forks 51 may be identical to that of the housings 36 or a modified mounting may be employed, as shown. In this case, a shaft 52 is fixed in a sleeve 53 of each fork 51. The shafts 52 are respectively journalled in the thrust and radial bearings 37 and 38 which are mounted in housings 36a of the forks 46. The same axes of articulation as previously described are therefore maintained.

Figures 19, 20:
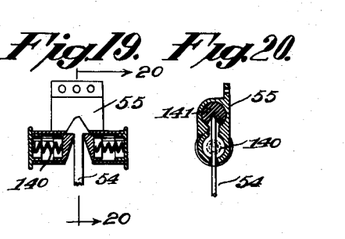
Figure 19 is a fragmentary sectional view of the device for locking the blade in flight position.
Figure 20 is a sectional view corresponding to line 20—20 of Figure 19.

It is desirable to lock the blades in their respective operative and storage positions. When the blades are hinged to their position of flight, that is, radially of the shaft 79, as in Figure 1, they are locked by means of latches 54 and keepers 55, which are shown in detail in Figures 19 and 20, and are disclosed in co-pending application, Serial No. 200,211 filed December 11, 1950, now abandoned. The latches 54 are hook-like elements which are rigidly mounted on the forks 51, there being a pair of these latches on each fork and on opposite sides thereof. A pair of keepers 55 are mounted on the end plates 23a of each root blade element 23, and each of these keepers comprises a pair of oppositely disposed and resiliently biased keeper elements 140 for engaging each latch 54, and a bumper or cushion 141 for abutment by the latch 54.

The locking means for retaining the blades in storage position comprises an eye or socket member 58 on each root element 23, as best shown in Figures 4 and 5, and pins 59 slidably mounted on the case 21 and resiliently biased for insertion in the respective eye or socket members 58. Thus, the pins 59, engaging in the eyes or sockets of the members 58, will retain the blades in storage position. Upon retraction of the pins 59, however, the blades will be swung about their pivots 27 to operative position by centrifugal action and/or the springs 60.

The pins 59 may be retracted by a direct cable connection (not shown) with the handle 31, as previously mentioned. It is preferred, however, to combine the release control for the pins 59 with the controls for initiating operation of the powder jets. Moreover, it is also preferred to provide such control means which are automatically actuated when the apparatus is launched from an airplane and functions as a parachute.

Referring now to Figure 6, a cable 73c may extend from the handle 16 to a lever 75 that is pivotally mounted on the plate 19. The lever 75, in turn, has three operative connections, namely, a cable 73b to one latch pin 59, a connecting rod 77 to the other latch pin 59, and a cable 86 connected with the powder jet control pin 82. The connecting rod 77 is connected to a second lever 76 which is pivotally mounted on the plate 19. A cable 73a is also connected to the lever 76 and trained about a pulley 74a to the second latch pin 59.

Thus, upon manual operation of the handle 16, the cable 73c pulls the lever 75 which, in turn, pulls the cable 73b, the rod 77 and the cable 86. The pull on the cable 73b will retract one pin 59 to release one blade. The pull on the rod 77 will swing the lever 76 which will pull cable 73a to retract the other pin 59 and release the other blade. The pull on the cable 86 will actuate the powder jet control pin 82 to start the powder jets 17, as will hereinafter be described. It will be understood that where the blades are rigidly mounted and the latch pins 59 eliminated, the handle 16, cable 73c, lever 75 and cable 86 will still be employed for actuating the powder jets 17.

In addition to the manual release of the blades, they may also be released automatically when the device is employed as a parachute and launched from an airplane. In this case, a cross-bar 70a (Fig. 6) is slidably mounted in slots 78 in the main shaft 79. This cross-bar 70a is connected by a cable 73 with the lever 76, the cable extending down through the shaft 79 and being trained around a pulley 74. A latch member 70 is carried by the cross-bar 70a, and this member 70, as best shown in Figure 7, has a pair of recesses in its opposite sides for respectively receiving the lugs 69 on a pair of spring fingers 68 of a latch 67 that is connected by a static wire 66 with the plane from which the apparatus is launched. The cross-bar 70a is also connected by a link 72 with a lever 71 that is pivotally mounted on the shaft 79 for engagement with a bumper 81 on the powder jet control pin 82.

When the apparatus is launched from a plane, the static wire 66 is duly payed out, and when its full length is reached, it yanks the latch 67 from the member 70 and this action causes the cross-bar 70a to be lifted in the slots 78. When the cross-bar 70a is lifted, it pulls on the cable 73 which, in turn, pulls on the lever 76. Movement of the lever 76 pulls on the latch pin cable 73a to release one pin 59 and pushes on the connecting rod 77 to move the other lever 75 which will pull cable 73b to release the other latch pin 59. To facilitate illustration, the pulleys 74 and 74a are shown as being mounted on the case 21 in Figure 5, while they are shown and being mounted on the plate 19 in Figure 6. The lifting of the cross-bar 70a will also pull upon the link 72 which will swing the lever 71 so that it will press down on the bumper 81 and the powder jet control pin 82. The pin 82 will also be pulled simultaneously by the cable 86 in view of the actuation of lever 75.

The remainder of the apparatus is the same regardless of the type of equipment and the manner of mounting the blades. The control systems are, in general, similar to those disclosed in Patent No. 2,640,549, and as shown in Figure 6, they embody anti-friction bearings that are slidably mounted on the main shaft 79 and have their outer elements operatively connected to and rotatable with the blades or parts carried thereby, while the inner members are slidable on the shaft 79 for movement to effect the control operations.

Figures 12, 13:
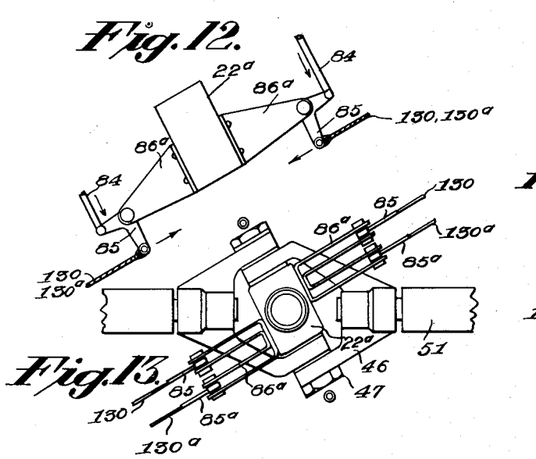
Figure 12 is a side view in elevation of the upper hub with the supports and control levers.
Figure 13 is a top plan view of the structure shown in Figure 12.

The first operation to be effected in operation of the apparatus is the actuation of the powder jets or rockets for initiating rotation of the blades. As previously indicated, this is effected by movement of the cross-pin 82 longitudinally of the shaft 79, either by the action of the cable 86 or the lever 71 or both. The cross-pin 82 is connected to the inner bearing element of an anti-friction bearing 80, the pin extending through slots 83 in the shaft 79. The pin 82 is normally biased upwardly by a spring 65. Links 84 are pivotally connected at one end to the outer bearing element, and at the other end to levers 85 which are pivotally mounted on brackets 86a which are carried by the upper hub 22a, as shown in Figures 12 and 13. The levers 85 are connected to rocket control cables 130.

A bearing 88 is fixed on the shaft 79 immediately below the bearing 80 to provide an upper journal for a hub extension 89 carried by the upper hub 22a. This hub extension 89 carries the fuel tanks 28 and 28a and is slotted to accommodate the supports for the links 84.

Below the bearing 88 is an engine throttle control bearing 90 (Figure 6) which has a cross-pin 90a slidable in the shaft 79. A spring 91 normally lifts the pin 90a and the control cable 13 is connected between said pin 90a and the control lever 12 (Figure 1). A pair of links 84a are connected between the outer element of the bearing 90 and a pair of levers 85a which are pivotally mounted on the bracket 86a of the upper hub 22a (Figures 12 and 13). The levers 85a are connected to throttle control cables 130a.

Another bearing 92 (Figure 6) is slidably mounted on the shaft 79 below the bearing 90. The inner bearing element of the bearing 92 is connected with a cross-pin 92a that is supported by a spring 93 and connected by the pitch control cable 15 with the pitch control lever 14 (Figure 1). Links 84b are connected with the outer element of the bearing 92, the other ends of said links being respectively connected with the ends 44a of the pitch control arms 44 on the root blade elements 23 (Figure 2).

The operation of the foregoing control bearings should be obvious. Each of the control pins 82, 90a and 92a are supported by their respective springs 65, 91 and 93, and are individually pulled downwardly by their respective control cables 86, 13 and 15. When any one of the cables are pulled down and the pins lowered, the bearing units 80, 90 or 92 are lowered and pushed down on their respective links 84, 84a or 84b. Depression of the links 84 or 84a will swing the respective levers 85 or 85a and thereby pull on the respective control cable 130 or 130a. Depression of the links 84b will depress arms 44 to cause the blades to rotate about their longitudinal axes and thereby vary their pitch angle.

In addition to the foregoing controls, means are also provided for regulating the telescopic extension and retraction of the blades. This means, as best shown in Figure 6, comprises a cable 96, 96a connected to the tip element of each of the blades and extending longitudinally through the blades to a winding reel 95 which is mounted on the lower hub 22 and within the case 21. This structure is of the same type as that disclosed in co-pending application, Serial No. 1,458, filed January 9, 1948, now Patent No. 2,637,406. The reel 95 has a hub portion 97 that is mounted around the hub 22 and supported by a flange 22b that is fixed to the hub 22. Nuts 98 and 99 are threaded on the hub 22 and frictionally couple the hub portion 97 with the flange 22b. The nut 99 is selectively adjusted to create sufficient friction between the hub portion 97 and the hub flange 22b to prevent rapid relative rotation and extension of the blades too quickly and to cause the reel 95 to normally rotate with the hub 22.

The cables 96, 96a are connected at their inner ends to the reel 95 and are payed out as the blades extend due to centrifugal action. The paying out of the cables and consequently the extension of the blades, as well as the winding of the cables on the reel to retract the blades, is controlled by a brake drum 101a fixed with the reel 95 and brake shoes 101 mounted in the case 21. This brake selectively overcomes the friction between the reel 95 and hub 22 to cause relative rotation therebetween.

The brake shoes 101 are movably mounted in the case 21 and are biased toward the drum 101a by springs 104. These shoes are retracted from the drum 101a by levers 103 which are pivotally mounted in the case 21 and are biased by springs 105 against the shoes 101. Control cables 102, 102a are connected between the levers 103 and the control handle 18 (Figure 1) for retracting the levers 103 in opposition to their springs 105 and thereby permitting the brake shoes 101 to be biased by their springs 104 into engagement with the drum 101a to cause the reel 95 and the hub to relatively rotate and thereby retract the blades by winding the wires 96 and 96a on the reel.

The pressure of spring 104 does not substantially give any rotational movement to lever 103, because the point of pressure of the shoe 101 on the lever 103 is disposed to act longitudinally to the said lever 103. Therefore, with a slight pull on wire 102, the lever 103 will be disengaged from the shoe 101 and the spring 104 will then push the shoe 101 upwardly against the drum 101a. The action of spring 105 will insure that the lever 103 will not be disengaged from the shoe 101 during flight conditions. The wire 102 is pulled down only after landing and when the speed of rotation of the blades has been sufficiently decreased.

When the rockets 17 are started, they will cause the blades to revolve. The rockets 17 are mounted on the tip elements of the blades and create centrifugal forces when the blades revolve. These forces cause the blades to telescopically extend to their full length, and in so doing, the tip elements draw the cables 96, 96a from the reel 95. As the hub 22 rotates with the blades, the reel 95 rotates faster than the hub 22 while the cables are drawn therefrom.

When the apparatus is landed and the engines are throttled so that the blades slow down, the brakes 101 may be applied to brake the speed of rotation of the reel 95 and cause the cable 96, 96a to wind thereon due to continued rotation of the blades, the winding cables retracting the blades until they are completely collapsed.

It is preferred that the cables 96, 96a serve the dual function of supplying electric current to the ignition systems of the engines 24. This eliminates the necessity of dual cables and permits a substantial reduction in the size of the reel 95. Accordingly, electric conductors are employed as cables, these conductors extending through the reel 95 and being secured by clamp nuts 106. An insulated drum 95a is fixed with the reel 95 and carries contact rings 107, 107a to which the cables 96, 96a are respectively electrically connected. Brushes 108, 108a are mounted in the case 21 and contact the rings 107, 107a respectively, said brushes 108, 108a being respectively connected with supply conductors 109, 109a which, in turn, are connected with a suitable source of electric current supply (not shown).

Figure 9:
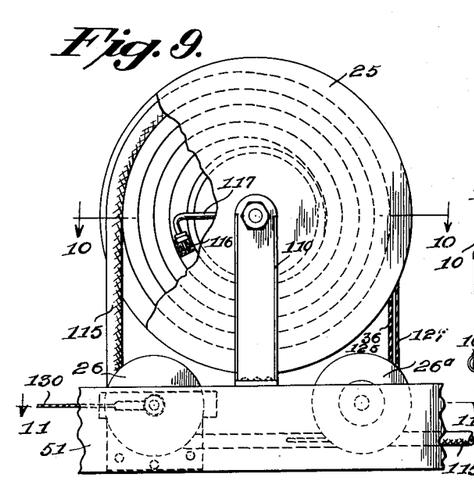
Figure 9 is an enlarged view in elevation of the supporting reel and pulleys for the fuel, ignition and control lines.
Figure 10:
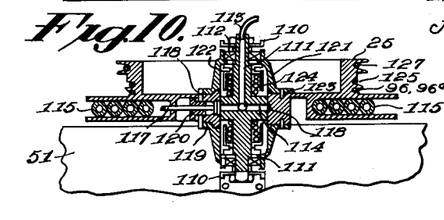
Figure 10 is a sectional view corresponding to line 10—10 of Figure 9.

As previously stated, the various control connections are guided into the blades by the reels 25 and pulleys 26 which are mounted on the bearing housings 36 or forks 51, as the case may be. For convenience in illustration, this reel and the pulleys are shown in Figures 9 and 10 as being mounted on a fork 51. Each reel 25 is journalled on a shaft 111 that is carried by a pair of supports 110. The shaft 111 has an axial bore 112, the open end of which is connected with an elbow 113 that is in communication with a fuel supply line 63 (Figure 2) from the respective fuel tank 28, 28a. The shaft 111 has a plurality of radial bores 114 in communication with the axial bore 112 and which open into a circumferential groove 118 in the hub of the reel 25.

A tube 117 extends radially of the reel from the groove 118, the joint between the tube and the reel being sealed by a spherical bronze gasket 119 and a threaded plug 120. The outer end of the tube 117 is connected by a nipple 116 with the inner end of a flexible fuel hose 115, which is coiled on the reel 25 and extends therefrom around the pulley 26 into and through the blade to the engine 24. Fuel leakage around the shaft 111 is prevented by joint rings 123 between the reel 25 and its hub portions 121 which are journalled on ball bearings 122 and by springs 124 which bear on said bearings.

Figure 14:
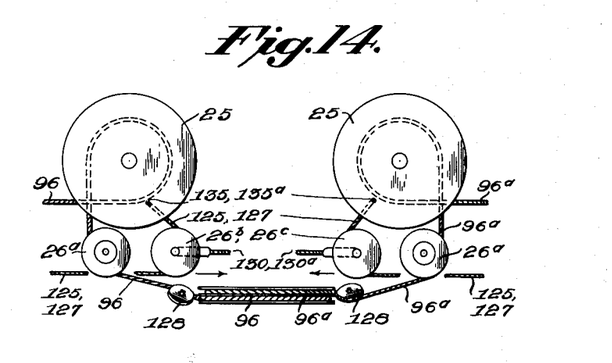
Figure 14 is a schematic view in elevation of the mountings and guides for the control lines.
Figure 15:
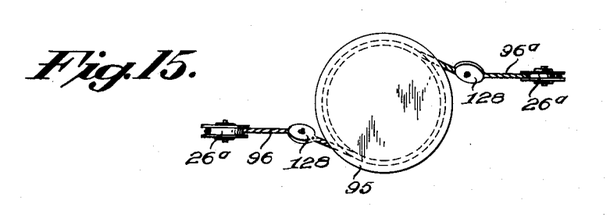
Figure 15 is a top plan view of the structure shown in Figure 14.

In addition to the fuel hose 115, the blade control and ignition cable 96 or 96a, a supplementary throttle control cable 125, and a supplementary powder rocket control cable 127 are also wound on the reel 25, these various cables being wound on different diameters in accordance with their respective diameters. The reel 25 serves to guide the blade control and ignition cable 96 or 96a, and this cable serves to rotate the reel to pay out or reel in the fuel hose 115, the supplementary throttle cable 125, and the supplementary rocket cable 127, as best shown in Figures 14 and 15.

From the central reel 95, the blade control cable 96 or 96a passes around guide pulleys 128 and 26a to the reel 25 and is wound around about three-quarters or 270° of the reel 25 and then extends through the blades. The winding of the cable 96 or 96a on the reel 25 is sufficient to drive said reel as the cable is payed out or wound on the main reel 95 to permit extension or effect retraction of the blades. By this arrangement, the reel 25 is driven to pay out or reel in the fuel hose 115 and the throttle and rocket control cables 125 and 127 respectively, in accordance with the extension and retraction of the blade.

Figure 11:
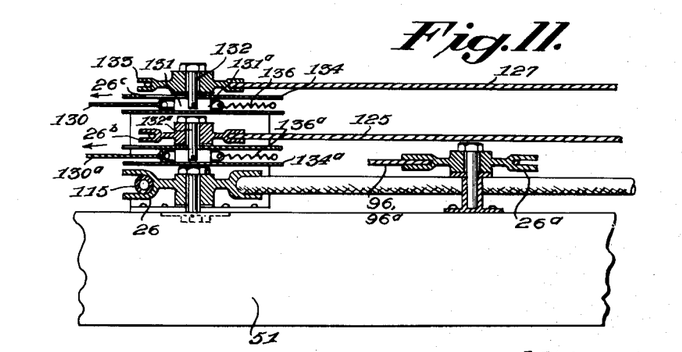
Figure 11 is a sectional view corresponding to line 11—11 of Figure 9.

The throttle control cable 125 and the rocket control cable 127 are respectively anchored at their inner ends 135 and 135a to the reel 25, are wound around said reel, and are trained around guide pulleys 26b and 26c respectively, as best shown in Figure 11, and then through the blade. The guide pulley 26c and 26b are respectively journalled on stud shafts 132, 132a which are fixed to carriers 131, 131a and slidably supported in slots 133, 133a in brackets 134, 134a. If the blades are radial, as shown in Figure 2, the several cables and lines extend directly into the root blade section 23, but if the blades are folded, as in Figure 4, these lines and cables extend around guides 126, which are curved about the axes of the pivots 27, and then into the blades.

The carriers 131, 131a are respectively connected on one side with springs 136, 136a which are anchored to the respective brackets 134, 134a, and on the other side with the aforementioned cables 130, 130a (Figures 11 and 12). The springs 136, 136a normally bias the pulleys 26c and 26b to positions which are coaxial with the fuel hose pulley 26. Upon actuation of the selected controls, however, a pull will be exerted on the respective cable 130, 130a which will slide the pulley 26c or 26b laterally and this will exert a pull on the respective cable 125 or 127 to actuate the throttle or rocket as desired.

Figure 16:
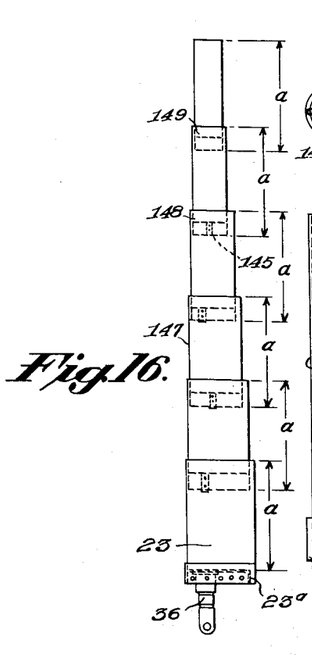
Figure 16 is a top plan view of a telescopic mass balanced blade.
Figure 17:
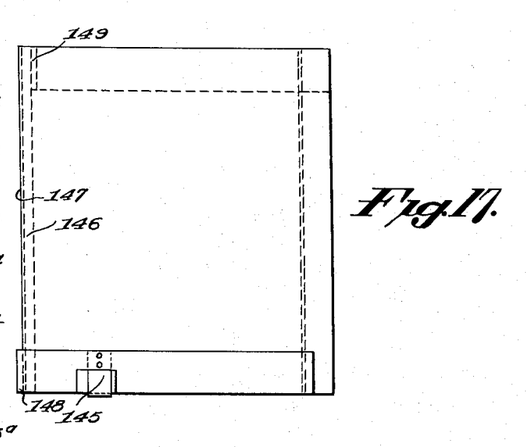
Figure 17 is a top plan view of a telescopic blade element.
Figure 18:
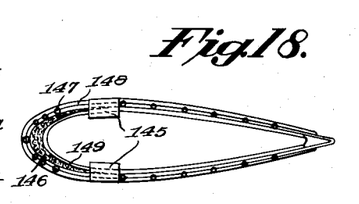
Figure 18 is an end view in elevation of the element shown in Figure 17.

The blades are preferably of the mass-balanced type as described in Patent No. 2,523,216 and as shown in Figures 16–18. Each element 23 of these blades is of precise aerofoil section, corresponding to data developed by laboratory tests for such sections, as described in the aforementioned patent. Except for the root element, the elements 23 are all of the same length $a$, as shown in Figure 16, so that when the blades are collapsed, all the elements are respectively located exactly within the length of the outer element or elements 23. The root element is slightly longer and has the length $a$ from its outer end to the end plate 23a. Spring stops 145 are provided on each of the intermediate elements 23 to limit the extent of retraction of one element with respect to the one surrounding it. The spring stops 145 are L-shaped and each have one branch thereof secured to the inner end of the respective element with the other branch extending inwardly of the respective element and forming an abutment for the inner edge of the respective surrounded element. These stops are adapted to be resiliently retracted outwardly of the respective element to withdraw the abutment branches to permit passage of the respective inner element and enable assembly and dismantling of the elements. Mass-balancing of the element, which means that its center of gravity is on or very near to its center of pressure, is effected by a metal plate 146 of variable thickness, the thickest part being at the leading edge, fixed in the interior of the leading edge 147 of the element, or it may form part of the element when the latter is moulded or drawn. Shoulders 148 and 149 limit the expansion of the element.

Figure 21:
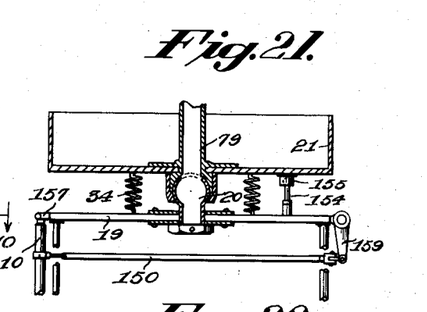
Figure 21 is a fragmentary view in elevation of the lever arrangement for controlling the machine.
Figure 22:
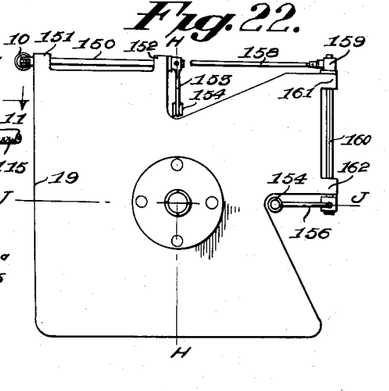
Figure 22 is a plan view of the structure shown in Figure 21.

The system for effecting the inclination of the rotor shaft 79 in the required direction is similar to that described in my Patent No. 2,506,873 and is shown in Figures 21 and 22. The main control lever 10, when swung longitudinally, controls the rotation of shaft 150 which is journalled in bearing supports 151 and 152 on plate 19. This shaft has an arm 153 which is connected to a vertical lever 154 fixed to the case 21 by means of a universal joint 155, as shown, for a second lever 156. When the lever 10 is swung transversely on the pivot 157, it will pull on the rod 158 which is connected to an arm 159 fixed on another shaft 160, journalled at right angles to shaft 150 by the bearing supports 161 and 162 on the plate 19. The rod 158 has a universal connection to the arm 159.

Therefore, when the control lever 10 is moved longitudinally, the shaft 150 will be rotated to swing its arm 153 so that the case 21 and the shaft 79 will be inclined along the direction of axis H—H of Figure 22. Conversely, when the lever 10 is moved laterally, it will pull the rod 158 to rotate the shaft 160 and swing the arm 156 so that the inclination of the case and shaft 79 will be along axis J—J of Figure 22.

The operation of the apparatus will be briefly reviewed. For a start from the ground, the pilot will first release the pins 59 holding the blades in their hinged position (if the blades are of the folding type) by a simple pull on the handle 31. The springs 60 will hinge the blades until they are locked automatically in their position of flight, one opposite to each other, for a two-bladed propeller. The second operation will be the starting of the powder rockets 17 mounted at the tips of the blades so as to initiate their rotation until they are fully extended and to accelerate this rotation until their top speed is sufficiently high for the starting of the ram jets 24 which are also fitted at the tips of the blades. The rockets 17 are started by a single pull on lever 16 and the jet engines 24 are started by actuating the switch 11. Fuel is fed from the reservoirs 28, 28a, one for each blade, in this example, when the blades are fully developed by means of centrifugal action through the lines 63 and reels 25 to and through the flexible fuel pipes 115 wound around said reels 25. The feeding of the fuel is controlled by the throttle lever 12 and connections to the supplementary control cable 125. The pitch of the blades is controlled by the lever 14 and connections to the arms 44 on the root ends of the blades.

The control of the machine in flight is effected by the action of the main control lever 10, which inclines the shaft 79 of the rotor in the required direction. The fin 4a is located at the rear where it utilizes the flow of air from the rotor. The inclination of this fin 4a is controlled by the double lever 8 or the handle 10a, as the case may be.

Once the apparatus is landed, the blades will be retracted by a simple pull on the brake handle 18, which will permit the operation of the braking system 101. The brake system is regulated so that the contact surfaces will slip and not act on the reel 95 before the speed of rotation of the blades has been decreased to the minimum safety value.

For the working of the machine as a parachute, the static wire 66 connected to the plane is attached at its lower end to a releasable device and is released by the shock due to the fall, but after having acted on the cable releasing the pins 59 holding the blades in their hinged position and on the cable which fires the starting powder rockets 17. Under the initial speed of rotation due to the action of these powder rockets, the blades will be extended, and with the immediate action of the air pressure due to the fall, they will be rapidly accelerated to a speed greater than that required for the initial starting of the ram jet engines 24. The blades are set in this flight for use as a parachute, that is, they have a negative pitch angle at the beginning of the fall, and the pitch is progressively increased to a positive value for low descent as a parachute. Then the ram jet engines will be started and the machine will continue its flight as a helicopter. In starting the flight as a parachute, the starting powder rockets can be much less powerful than those required for the starting in helicopter flight.

Although certain specific embodiments have been shown and described, it is obvious that many modifications thereof are possible. For example, the main control reel 25 can be lowered so that the feeding pipe can directly go through the blade without the use of the secondary pulleys 26. The spring 34 between the case 21 and the upper plate 19 can be omitted and be replaced by a single spring acting on the main control lever 10. The four tubes supporting the apparatus on the pilot's body can be replaced by three tubes, or any other convenient structure. The invention, therefore, is not to be restricted except insofar as is necessitated by the spirit of the appended claims.

That which is claimed as new is:

1. A helicopter, comprising a support, an upright shaft on said support, a hub rotatably mounted on said shaft, a plurality of telescopic blades each composed of a plurality of telescoping blade elements adapted to be telescoped to storage position and extended to operative position, means journalling the root elements of said blades on said hub, engines on the tip elements of said blades, fuel feeding means carried by said hub, reel means rotatably mounted at the root ends of said blades, flexible control and fuel lines wound on said reel means and extending longitudinally through said blades to said engines, passage means between the inner ends of said fuel lines and the rotatable mountings of said reel means, passage means between the fuel feeding means and said rotatable mountings of said reel means, and means engaging said control lines for actuating said control lines.

2. A helicopter, as defined in claim 1, comprising a reel on said hub, electric cables wound on said hub and anchored at one end to said reel and at the other end to the tip elements of said blades respectively, electric connections between said electric cables and said engines, electric supply means connected with the inner ends of said cables, and brake means on said support and cooperative with said reel to regulate the paying out and reeling in of said cables and control the expansion and retraction of said blades.

3. A helicopter, as defined in claim 2, wherein said electric cables are wound about said reel means between said reel and said blades to drive said reel means.

4. A helicopter, as defined in claim 1, wherein said actuating means includes guide pulleys, means supporting said guide pulleys for sliding movement transverse the axis thereof to actuate said control lines, and means connected with said pulleys for selectively sliding said pulleys, said control lines extending from said reel means over said guide pulleys before entering said blades.

5. A helicopter, comprising a support, a plate attached to the said support substantially above the center of gravity of said support, a case mounted above said plate, a universal joint between said plate and said case, a substantially vertical shaft mounted on said case, a hub rotatably mounted on said shaft, a plurality of telescopic blades, means supporting each of said blades on said hub for pivotal movement on three different axes including a horizontal axis which is inclined toward the leading edge of the blade, a substantially vertical axis and an axis longitudinally of the blade, engines mounted on the tips of the blades, reels mounted at the root ends of said blades, flexible fuel pipes and control lines wound on said reels and passing longitudinally through said blades to said engines, fuel reservoirs rotatably mounted around the shaft and above the said blades, fuel supply lines extending from said reservoirs to the centers of rotation of the said reels, means operatively connected with said blades for initially rotating said blades, means on said case for effecting the synchronized expansion and retraction of the blades and for the synchronized expansion and retraction of the flexible fuel pipes and control lines which pass through the interior of the blades, means on said support and operatively connected with said shaft to control the direction of flight of the helicopter, and means on said case for simultaneously controlling the pitch angle of the blades.

6. A helicopter, according to claim 5, in which the means for synchronizing the expansion and retraction of the blades and the flexible fuel pipes and control lines of the engines which pass through the interior of the outermost elements comprise a reel frictionally mounted on said hub, cables attached to and wound on said latter reel, said cables extending to and being wound around said first-mentioned reels and then extending through said blades and being connected to the tip element of said blades.

7. A helicopter, according to claim 6, wherein said cables are electric conductors and are connected with said engines to function as ignition wires.

8. A helicopter, according to claim 5, in which the means for initially rotating the blades comprises rockets mounted at the tips of the blades near the engines.

9. A helicopter, according to claim 5, in which the means for controlling direction of flight comprises a control lever for inclining said shaft in the required direction, said lever being articulated on said plate and connected to two shafts disposed at right angles and having arms connected with said case for inclining said case with respect to said plate around said universal joint.

10. A helicopter, according to claim 5, wherein said blades are pivotal on said vertical axes between storage positions in which they are folded back adjacent said shaft and operative positions in which they are substantially radial of said shaft, releasable latch means on said case and cooperative with said blades to retain them in storage positions, control means for releasing said latch means to simultaneously release said blades, spring means between said blades and said blade supporting means for biasing said blades to operative positions, and latch means between said blades and their supporting means for locking said blades in operative position.

11. A helicopter, according to claim 10, wherein said control means for releasing said blades comprises a releasable latch element for actuating said control means, and a static wire connectable to a plane and having a latch cooperative with said latch element, said blades being initially set at a negative angle to effect auto-rotation upon descent, whereby said helicopter is adapted for use as a parachute.

12. A helicopter, according to claim 10, wherein said means for initially rotating said blades comprises rockets mounted on said blades, and said control means for releasing said blades includes means for starting said rockets.

13. A helicopter, according to claim 12, wherein said control means for releasing said blades and for starting said rockets comprises a releasable latch element for actuating said control means, and a static wire connectable to a plane and having a latch cooperative with said latch element, said blades being initially set at a negative angle to effect auto-rotation upon descent, whereby said helicopter is adapted for use as a parachute.

14. A helicopter, comprising a support, a plate horizontally attached to the said support substantially above the center of gravity of said support, a universal joint on said plate, a case supported by said universal joint, a shaft fixed on said case, a hub freely rotatable on said shaft, a plurality of telescopic blades, blade support means pivotally mounted on said hub around a horizontal axis and supporting said blades for hinging movement around vertical axes and around their longitudinal axes for pitch control, resilient means between said blades and support means near the said vertical hinge axes to limit articulation of said blades on said vertical axes, a reel rotatably mounted on said hub, cables anchored to and wound on said reel and extending through said blades for effecting synchronized expansion and retraction of the blades, adjustable friction means between said reel and said hub for regulating the rotation of said reel, brake means on said case and cooperative with said reel, manually operable means for controlling said brake means, rotary electric contact means between said reel and said case, engines mounted at the tips of said blades, said cables comprising electric conductors and being electrically connected between said rotary contact means and the ignition systems of said engines, and manually operable means for controlling the supply of electric current to said rotary contact means.

15. A helicopter, as defined in claim 14, wherein said blades are each provided with an arm for pivoting the blades about their longitudinal axes to vary the pitch angle thereof, rockets mounted at the tips of said blades, reels mounted on the root ends of said blades, guide pulleys on the root ends of said blades, flexible fuel pipes and throttle and rocket control lines anchored to and wound on said latter reels and trained around said guide pulleys and extending through said blades, said fuel pipes having communication connections through the axis of said reels, rotatable fuel reservoirs mounted around said hub, fuel lines from said reservoirs to the center of the said reels for supplying said fuel pipes, said guide pulleys for said control lines being slidably mounted for pulling on said control lines, said blade extension control cables being wrapped around said reels to drive said reels to pay-out or wind-in said pipes and lines, levers pivotally mounted on said hub and connected to said guide pulleys for sliding said pulleys to actuate said lines, a plurality of anti-friction bearings slidable on said shaft, connections respectively between said bearings and said levers and blade arms, means for selectively sliding said bearings, a pair of shafts journalled on said plate at right angles to each other, a control lever pivotally mounted on one said shaft and operative to rotate said shaft, a connecting rod between said lever and the other said shaft to rotate said latter shaft, and arms on said pair of shafts and connected with said case to incline the case with respect to the plate to effect the desired direction of flight.

References Cited in the file of this patent

UNITED STATES PATENTS

| 1,819,863 | Bleecker | Aug. 18, 1931 |
| 1,840,152 | Buchanan | Jan. 5, 1932 |
| 1,897,092 | Weir | Feb. 14, 1933 |
| 2,108,245 | Ash | Feb. 15, 1938 |
| 2,192,881 | Bothezat | Mar. 13, 1940 |
| 2,461,347 | Pentecost | Feb. 8, 1949 |
| 2,640,549 | Isacco | June 2, 1953 |

FOREIGN PATENTS

| 427,951 | France | June 10, 1911 |
| 673,964 | Germany | Apr. 1, 1939 |
| 865,452 | France | Feb. 24, 1941 |